May 7, 1929.  E. E. UNDERWOOD  1,711,977
MOTION PICTURE PROJECTOR
Filed June 21, 1927
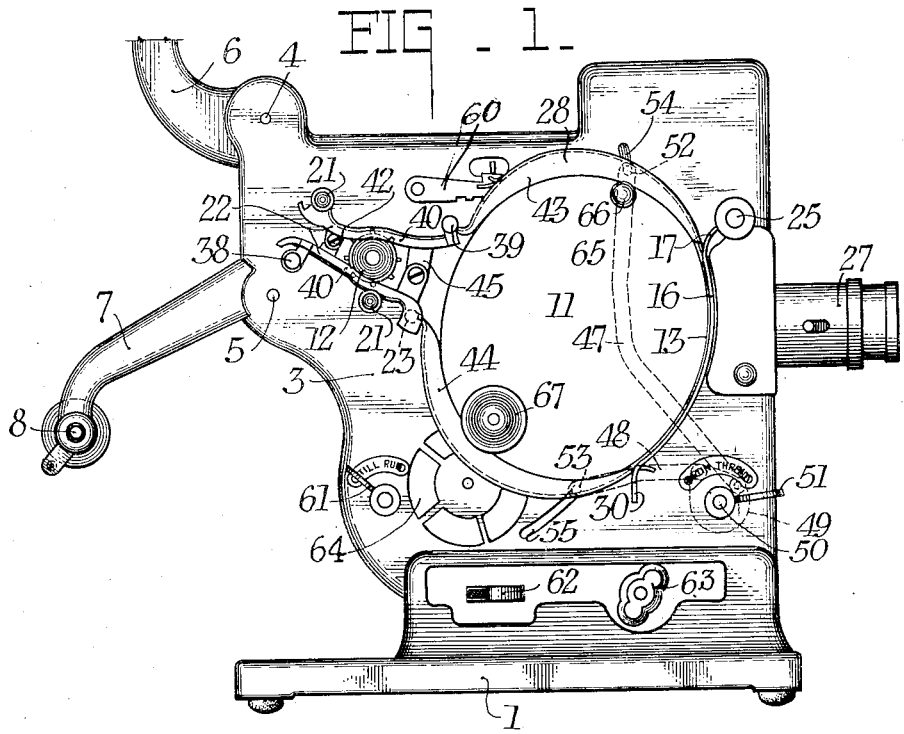
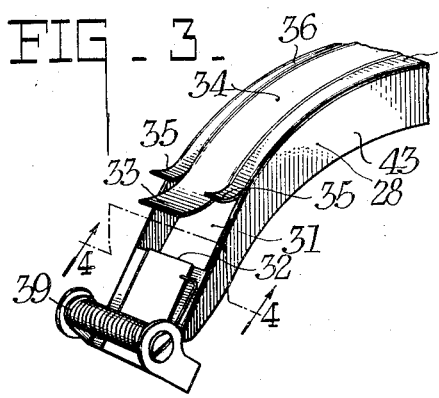
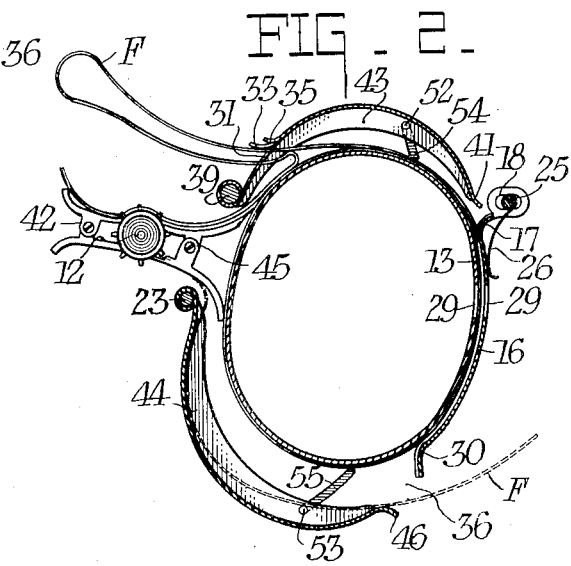
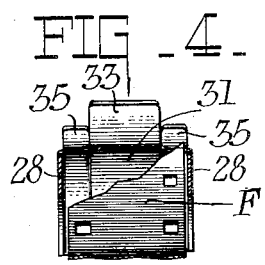
INVENTOR,
Ernest E. Underwood,
BY R. L. Stinchfield
N. M. Permus
ATTORNEYS.

Patented May 7, 1929.

1,711,977

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

MOTION-PICTURE PROJECTOR.

Application filed June 21, 1927. Serial No. 200,400.

This invention relates to improvements in motion picture projectors and particularly to such apparatus of a type disclosed in the co-pending application of A. Stuber and the present applicant, Serial No. 73,119, filed Dec. 4, 1925, in which provision is made for the automatic threading of film through the projector.

In the machine there disclosed, loop forming guides are positioned to direct the film through the machine. It has been found that, should the film break during operation of the machine, or should the film not pass properly in threading, it has a tendency to buckle on itself and form tight folds damaging the film.

The principal object of my invention is to overcome this trouble and this I accomplish by providing suitable passageways through which loops or ends of film can escape without damage Other objects and advantages will appear from the following description in which reference will be made to the accompanying drawing, in the several figures of which the same reference characters denote the same parts and in which Fig. 1 is a side view of a projector embodying my invention;

Fig. 2 is a fragmentary section showing the film guiding elements;

Fig. 3 is a perspective view of a detail of one guide member;

Fig. 4 is a section on line 4—4 of Fig. 3 showing the relation of a broken film end to the edge of an aperture in the guide.

The apparatus in the form shown comprises a base 1 and a longitudinal wall or frame 3 to which is pivoted at 4 and 5 arms 6 and 7 for supporting reels, one reel shaft being shown at 8. The frame 3 carries a casing 11 about which the film may be looped; being propelled continuously from one reel to the other by sprocket 12 and being intermittently advanced past the film gate by any suitable mechanism not shown. The gate is constituted by the curved front wall 13 of the casing 11 and a curved presser member 16, the latter having at its lower end an inclined extension 30 and at its upper end an inclined arm 17 with a slit 18 having a sliding and pivotal engagement with pin 25 on wall 3 and pressed by spring 26 toward wall 13. An objective mount 27 is also shown, this being in alignment with the windows 29 in the gate members Near sprocket 12 are two trunnions 38 and 39 on which are pivoted two guide members 40 which are normally held in the indicated guiding relation with sprocket 12 by releasable latches 21. These guide members 40 have edge flanges 22 between which are fixed guide members 42 outside of the sprocket and others 45 between the sprocket and the casing 11.

Pivoted on trunnion 39 is a film guiding and threading member 43 and pivoted on a lower trunnion 23 is a second similar member 44, these guiding members having guard flanges 28 along their edges. Their ends have paths of movement engaging the inclined ends 17 and 30 of presser 16 and are adapted to cam this out as described in the application referred to.

The guide members 43 and 44 are simultaneously moved through links 47 and 48 lying behind frame 3 and connected to a common disc 49 mounted on a shaft 50 extending through the frame 3 and controlled by handle 51. They are connected by pivot pins 52 and 53 extending through slots 54 and 55 in frame 3 with the members 43 and 44.

There is formed in the guide member 43 near the pivot 39 an aperture 31 which extends the full width of the member, this being, of course, wider than the film F used with the projector.

The edge 32 of the aperture nearer the pivot is straight transversely of the guide. The other end has an outwardly curved central wide tongue 33 corresponding in width to the central embossing 34 of the guide, and outwardly curved edge tongues 35 which are extensions of the film contacting border portions 36 of the guide.

Ordinarily a film when introduced between the upper guides 40 and 42 while the parts are in the position shown in Fig. 1 will be automatically threaded through the machine in the manner described in the said application. It will normally engage guide 43 and be guided by the wall 36 by which it will be deflected to the inner wall of guide 43 beyond hole 31 and thence to the gate. If the end of the film is irregularly torn as shown in Fig. 4 and the film also has a pronounced upward curl this end may engage the hole 31. I have found that by forming the tongues 35 and 33 in the manner shown and described, such an end will be deflected along the guide 43 in the proper manner, whereas if the edge were straight or formed in a single tongue it would tend to go through the hole or engage the edge of it and buckle.

When the film is properly threaded the guides 43 and 44 are opened to the position shown in Fig. 2. It is to be noted that there is provided between the outwardly curved ends 46 and 30 a space 36 wider than has previously been provided at this point.

It sometimes happens that during projection an improperly made splice will come apart. With the structure shown in the application referred to, there was a tendency for the advancing free end thus formed to catch at some point and the film would then buckle on itself to form sharp folds or crimps that mutilated part of the film. If such a break occurs above the gate the end might catch at the top of the gate as shown in Fig. 2. The back pressure of the film which is meanwhile being advanced by sprocket 12 will now cause the surplus to be forced out through aperture 31 in a loop without sharp bends. The operator can easily stop the machine and rethread the film without damage. If the break occurs at or beyond the gate the film end will either protrude through the wide space 36 or be threaded automatically out past sprocket 12, it being noted that the parts associated with the pivoted end of guide 44 and the sprocket are not moved from guiding position. If the film end should happen to catch, the surplus loop would protrude through the opening 36.

Since the described projector is constructed to pass film in either direction, the break might occur when the direction of movement is reversed. If it occurs below the gate, the free end will protrude through opening 36, shown in Fig. 2; if it occurs at or above the gate, it will protrude through opening 31. In any event there is provided a means for the escape of the film without sharp bends or folds, if it should break while being passed through the projector in either direction.

All of the details of the projector are not shown, being not important to the invention herein claimed. Some of the details incidentally shown, however, include a latch 60 for holding a rewinding gearing in place, a control 61 for stopping the projector, control switches 62 and 63, ventilating apertures 64, the cover 65, latch 66 for holding the cover 65 of the casing in place and a mechanism adjusting thumb piece 67.

It is to be understood that I contemplate as within my invention such modifications and equivalents as fall within the scope of the appended claims.

Having thus described my invention, what I claim as new and desire to secure by Letters Patent is,—

1. In a motion picture projector, a series of sets of opposed guides, the successive sets overlapping and constituting channels leading from one to the other to direct the lead end of a film automatically through the projector in a predetermined normal path, there being in one of the guides an aperture in a position out of such path whereby it is not ordinarily contacted by the film but through which, in case of accidental buckling of the film, a loop of film may protrude.

2. In a motion picture projector, a series of sets of opposed guides, the successive sets overlapping and constituting channels leading from one to the other to direct the lead end of a film automatically through the projector in a predetermined normal path, there being in one of the guides an aperture in a position out of such path whereby it is not ordinarily contacted by the film and having one edge formed into recurved tongues of different lengths.

3. In a motion picture projector, a gate, a convex guide and a concave guide opposed thereto, the two guides together constituting a channel for directing a lead end of a film to the gate, the concave guide having near its end farther from the gate an opening permitting the extrusion of a loop of film from said channel.

4. In a motion picture projector, a gate, a convex guide and a concave guide opposed thereto, the two guides together constituting a channel for directing a film to the gate, the concave guide having near its end farther from the gate an opening permitting the extrusion of a loop of film from said channel and being pivoted at said end whereby it may be swung away from the convex guide.

5. In a motion picture apparatus, a gate, means for automatically guiding the lead end of a film to, through and from said gate, said means comprising opposed curved guide members constituting channels for said film, the curvature thereof normally directing the film in a predetermined path, there being in one of the guides in a position not contacted by the film in its normal path a hole through which a loop of film may protrude in case of accidental buckling.

6. In a motion picture apparatus, a frame, a casing on said frame having a curved periphery, a presser member constituting with a portion of said periphery a projector gate, a curved guide member hinged at its end farther from said gate to the frame above the casing and constituting with the corresponding portion of the casing a channel for automatically directing the lead end of a film toward the gate, there being in the guide near the pivot an aperture wider than such film, whereby a loop of film may protrude in case of accidental buckling.

7. In a motion picture projector, a series of sets of opposed guides constituting a channel leading through the projector to direct the lead end of a film therethrough in a normal path, certain of the guides being movable to separate consecutive guide members and the separated guide members being formed to direct a film out through the space so formed, one of the guide members having an aperture out of the normal path through which, in case of accidental buckling of the film, part of the film may protrude.

Signed at Rochester, New York, this 16th day of June, 1927.

ERNEST E. UNDERWOOD.